US008192062B2

(12) United States Patent
Tatsukawa

(10) Patent No.: US 8,192,062 B2
(45) Date of Patent: Jun. 5, 2012

(54) VEHICULAR LAMP

(75) Inventor: Masashi Tatsukawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 316 days.

(21) Appl. No.: 12/571,869

(22) Filed: Oct. 1, 2009

(65) Prior Publication Data

US 2010/0085769 A1 Apr. 8, 2010

(30) Foreign Application Priority Data

Oct. 2, 2008 (JP) ................................ 2008-257045

(51) Int. Cl.
*B60Q 1/00* (2006.01)
*F21V 11/00* (2006.01)
*F21V 7/00* (2006.01)
*F21V 5/00* (2006.01)

(52) U.S. Cl. ......... 362/539; 362/538; 362/516; 362/520

(58) Field of Classification Search .................. 362/538, 362/539, 506, 507, 514, 545, 308, 327, 328, 362/516, 520
See application file for complete search history.

(56) References Cited

U.S. PATENT DOCUMENTS 6,309,094 B1 * 10/2001 Woerner ....................... 362/539
7,540,638 B2 * 6/2009 Dassanayake et al. ....... 362/465
2006/0028833 A1 2/2006 Yagi et al.
2006/0062011 A1 3/2006 Yamamura
2006/0098450 A1 * 5/2006 Iwasaki ......................... 362/545

FOREIGN PATENT DOCUMENTS

DE 4306316 A1 9/1993
DE 10037196 A1 2/2001
DE 10100176 A 7/2001
EP 1647764 A2 4/2006
EP 1980786 A1 10/2008
JP 2003-288805 A 10/2003

OTHER PUBLICATIONS

Extended European Search Report for Application No. 09172069.8-1268, dated Dec. 30, 2009, 8 pages.

* cited by examiner

*Primary Examiner* — David Crowe
(74) *Attorney, Agent, or Firm* — Sughrue Mion, PLLC

(57) ABSTRACT

A vehicular headlamp is provided. The vehicular lamp includes a projection lens disposed on an optical axis of a lamp extending in a longitudinal direction of a vehicle; a light source disposed on a rear side of a rear focal point of the projection lens; a reflector that concentrates the light emitted from the light source on the projection lens; and a shade disposed such that an upper edge of the shade extends through the vicinity of the rear focal point to block a part of the light reflected from the reflector. In plan view, the light source is disposed near the central axis of the reflector, and the reflector is disposed such that the central axis of the reflector intersects the optical axis of the lamp in a vicinity of the projection lens while being inclined toward the own lane of the vehicle on the front side.

3 Claims, 5 Drawing Sheets

VEHICULAR LAMP

This application claims priority from Japanese Patent Application No. 2008-257 045, filed on Oct. 2, 2008, the entire contents of which are herein incorporated by reference.

BACKGROUND OF THE INVENTION

1. Technical Field

The present disclosure relates to a vehicular lamp that emits light so as to form a low-beam light distribution pattern, and more particularly, to a so-called projector type vehicular lamp.

2. Related Art

In a projector type vehicular lamp, a projection lens is disposed on the optical axis of the lamp extending in the longitudinal direction of a vehicle, a light source is disposed on the rear side of a rear focal point of the projection lens, and the light emitted from the light source is reflected by the reflector so as to be concentrated on the projection lens.

For example, JP-A-2003-288805 describes a related art projector type vehicular lamp in which a shade, which blocks a part of the light reflected from a reflector, is disposed such that the upper edge of the shade is disposed near the rear focal point of a projection lens, and thus light is emitted to form a low-beam light distribution pattern.

In the related art projector type vehicular lamp, if the central axis of the reflector is moved parallel to the optical axis of the lamp toward the opposite lane, a position where the light, which is emitted from the light source and reflected from the reflector, passes through the rear focal plane of the projection lens may be displaced toward the opposite lane as a whole as compared to when the central axis of the reflector is not moved parallel to the optical axis of the lamp. Accordingly, it may be possible to displace a low-beam light distribution pattern, which is formed as the reverse image of a light source image formed on the rear focal plane of the projection lens, toward the own lane, i.e., the lane in which the vehicle is traveling, as a whole as compared to when the central axis of the reflector is not moved parallel to the optical axis of the lamp. Accordingly, it may be possible to form a hot zone, i.e., an area having a high luminosity, of the low-beam light distribution pattern at a position that is close to the own lane in the forward direction of the lamp.

However, the above-mentioned structure has the following disadvantages.

That is, if the light reflected from the reflector enters the projection lens as a convergent light flux, the incident angle of the light, which is reflected from the end area of the reflecting surface of the reflector corresponding to the opposite lane and which enters the projection lens is significantly large on the front surface of the projection lens. Thus, the light is totally reflected from the front surface and is not emitted forward. Accordingly, it is difficult to effectively use the luminous flux of the light source.

In this case, the light, which is reflected from the end area of the reflecting surface of the reflector corresponding to the opposite lane, becomes the light that forms the diffusion area of the low-beam light distribution pattern corresponding to the own lane. However, since this light is not obtained, the diffusion angle of the low-beam light distribution pattern corresponding to the own lane is decreased.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any disadvantages described above.

Accordingly, it is an aspect of the present invention to provide, in a projector type vehicular lamp adopted to form a low-beam light distribution pattern, a vehicular lamp that can effectively use the luminous flux of a light source and form a hot zone of a low-beam light distribution pattern at a position that is close to the own lane in the forward direction of the lamp without sacrificing the diffusion angle of the low-beam light distribution pattern corresponding to the own lane.

According to one or more exemplary embodiments of the present invention, there is provided a vehicular lamp. The vehicular lamp comprises a projection lens that is disposed on an optical axis of a lamp extending in a longitudinal direction of a vehicle; a light source that is disposed on a rear side of a rear focal point of the projection lens; a reflector that reflects light emitted from the light source so as to concentrate the light on the projection lens; and a shade that is disposed such that an upper edge of the shade extends through the vicinity of the rear focal point so as to block a part of the light reflected from the reflector. In plan view, the light source is disposed near the central axis of the reflector, and the reflector is disposed such that the central axis of the reflector intersects the optical axis of the lamp in a vicinity of the projection lens while being inclined toward the own lane of the vehicle on the front side.

Other aspects and advantages of the present invention will be apparent from the following description, the drawings and the claims.

DETAILED DESCRIPTION OF EXEMPLARY EMBODIMENTS

Exemplary embodiments of the present invention will be now described with reference to drawings.

Figure 1:
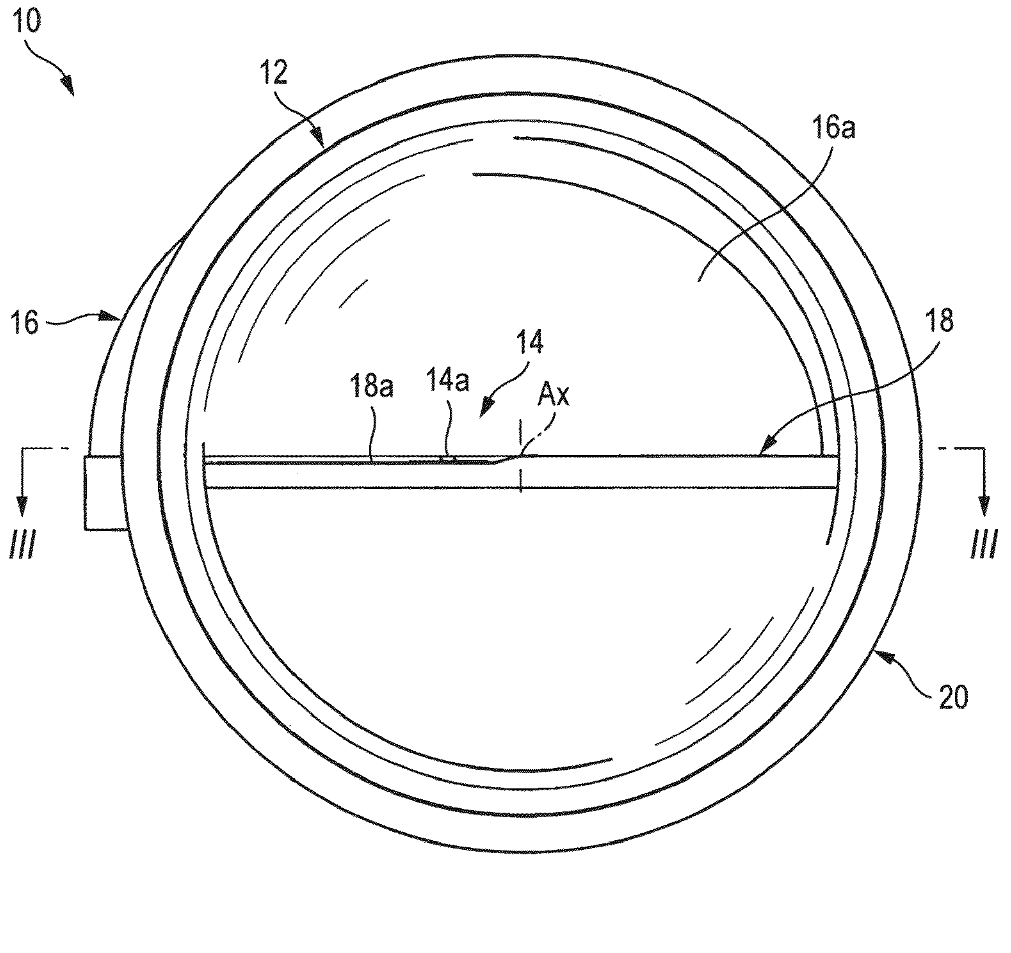
FIG. 1 is a front view of a vehicular lamp according to an exemplary embodiment of the invention.
Figure 2:
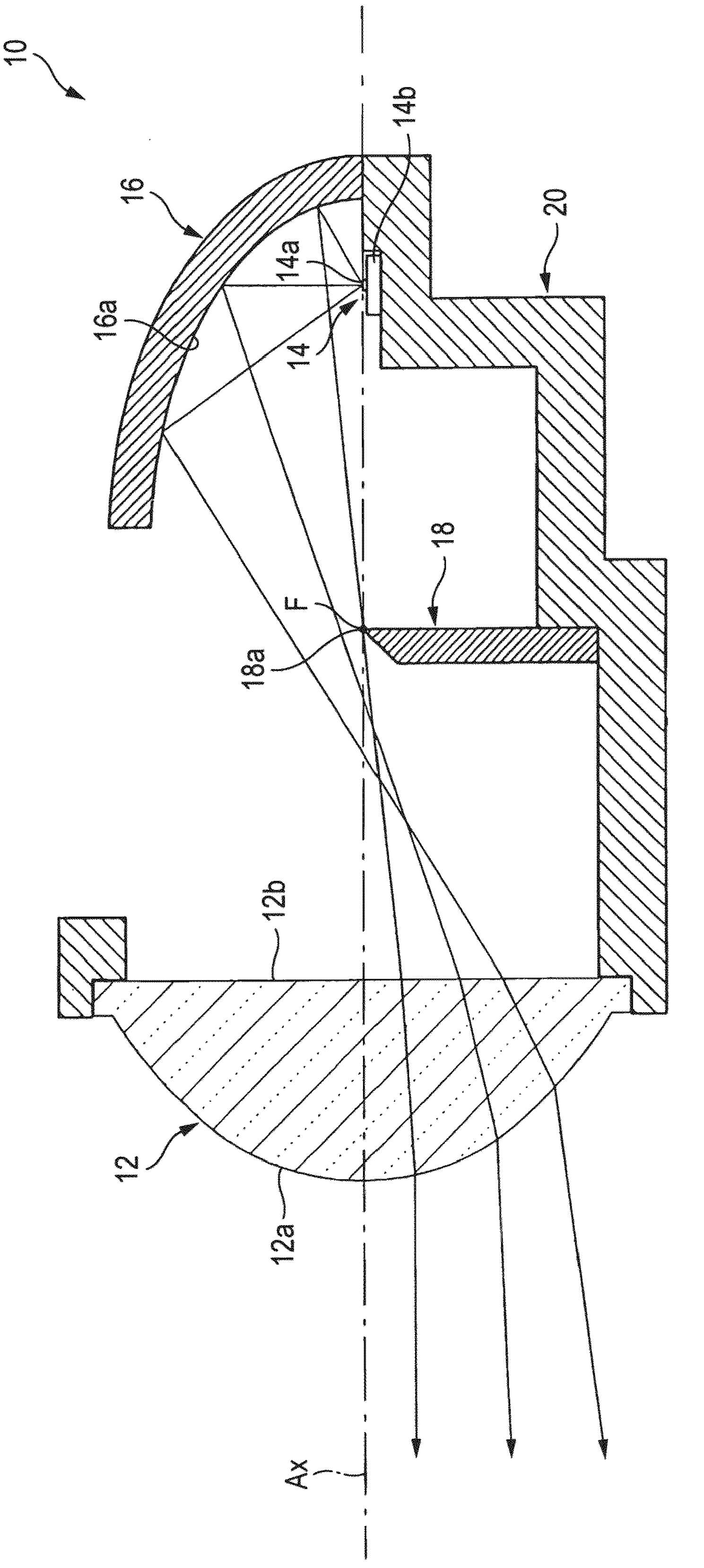
FIG. 2 is a cross-sectional view of the vehicular lamp taken along a line II-II of FIG. 3A.

FIG. 1 is a front view of a vehicular lamp 10 according to an exemplary embodiment of the invention, and FIG. 2 is a cross-sectional view of the vehicular lamp 10. Furthermore, FIG. 3A is a schematic cross-sectional view of the vehicular lamp 10, taken along a line III-III of FIG. 1. Meanwhile, FIG. 2 is a cross-sectional view taken along a line II-II of FIG. 3A.

As shown in FIGS. 1-3, the vehicular lamp 10 is formed as a projector type lamp that emits light so as to form a low-beam light distribution pattern. The vehicular lamp 10 is tiltably supported by a lamp body (not shown) or the like as a part of a headlamp.

The vehicular lamp 10 includes: a projection lens 12 that is disposed on an optical axis Ax of the lamp extending in the longitudinal direction of a vehicle; a light source 14*a* that is disposed on the rear side of a rear focal point F of the projection lens 12; a reflector 16 that reflects the light emitted from the light source 14*a* so as to concentrate the light on the projection lens 12; a shade 18 that blocks a part of the light reflected from the reflector 16; and a holder 20 that supports these components.

Furthermore, the vehicular lamp 10 is disposed such that the optical axis Ax of the vehicular lamp 10 is inclined downward with respect to the longitudinal direction of a vehicle by an angle of about 0.5 to 0.6° when the vehicular lamp is assembled as a part of a headlamp.

The projection lens 12 is formed of a plane-convex aspherical lens that has a convex front surface 12*a* and a flat rear surface 12*b*. The projection lens 12 is configured to project a light source image, which is formed on a rear focal plane of the projection lens 12 (that is, a focal plane including a rear focal point F), on a virtual vertical screen that is formed ahead of the lamp, as a reverse image.

The light source 14*a* is a light-emitting chip of a white light-emitting diode 14. The light source 14*a* includes a rectangular light-emitting surface, and is supported by a substrate 14*b*. Furthermore, the white light-emitting diode 14 is fixed to the holder 20 such that the light-emitting surface of the light source 14*a* faces vertically upwards. In this case, the light source 14*a* is disposed at a position that is displaced toward an opposite lane with respect to the optical axis Ax of the lamp (that is, the right side (left side as seen from the front side of the lamp)).

The reflector 16 is disposed above the light source 14*a* so as to cover the light source 14*a* and formed in the shape of a substantially half dome. The lower edge of the reflector 16 is fixed to the holder 20. The reflector 16 is disposed such that a central axis Ax1 of the reflector 16 intersects the optical axis Ax of the lamp in the vicinity of the rear surface 12*b* of the projection lens 12 while being inclined toward an own lane (that is, left side) on the front side.

In this case, the inclination angle of the central axis Ax1 of the reflector 16 toward the own lane is set to about 7°. The central axis Ax1 extends in a plane that includes the optical axis Ax of the lamp. Furthermore, the light source 14*a* is disposed on the central axis Ax1.

A reflecting surface 16*a* of the reflector 16 is formed of a substantially elliptical curved surface whose major axis is concentric with the central axis Ax1 and whose first focal point corresponds to the emission center of the light source 14*a*, and the eccentricity thereof is gradually increased from a vertical cross section toward a horizontal cross section. Further, in the vertical cross section, the reflecting surface 16*a* is formed so as to make the light, which is emitted from the light source 14*a*, converge slightly ahead of the rear focal point F of the projection lens 12. Also, in the horizontal cross section, the reflecting surface 16*a* is formed so as to considerably displace the convergence position to the front side (specifically, the front side of the rear surface 12*b* of the projection lens 12) from the rear focal point F.

Accordingly, the reflector 16 makes the light, which is emitted from the light source 14*a* and reflected from the reflecting surface 16*a*, enter the projection lens 12 as divergent light flux in the vertical direction. Furthermore, the reflector makes the light enter the projection lens 12 as a convergent light flux in the horizontal direction.

The reflector 16 is formed such that both (left and right) edges of the reflecting surface 16*a* of the reflector 16 extend up to a position positioned ahead of the rear focal point F of the projection lens 12.

The shade 18 is disposed such that the upper edge 18*a* of the shade 18 passes through the rear focal point F. In this case, the upper edge 18*a* is curved forward from a position on the optical axis Ax of the lamp toward both (left and right) sides. Furthermore, a left area of the upper edge 18*a*, which is positioned on the left side of the optical axis Ax, extends in a horizontal plane including the optical axis Ax. Furthermore, a right area of the upper edge 18*a*, which is positioned on the right side of the optical axis Ax, extends in a horizontal plane that is lower than the left area through a short slope. A lower end of the shade 18 is fixed to the holder 20.

Figure 4:
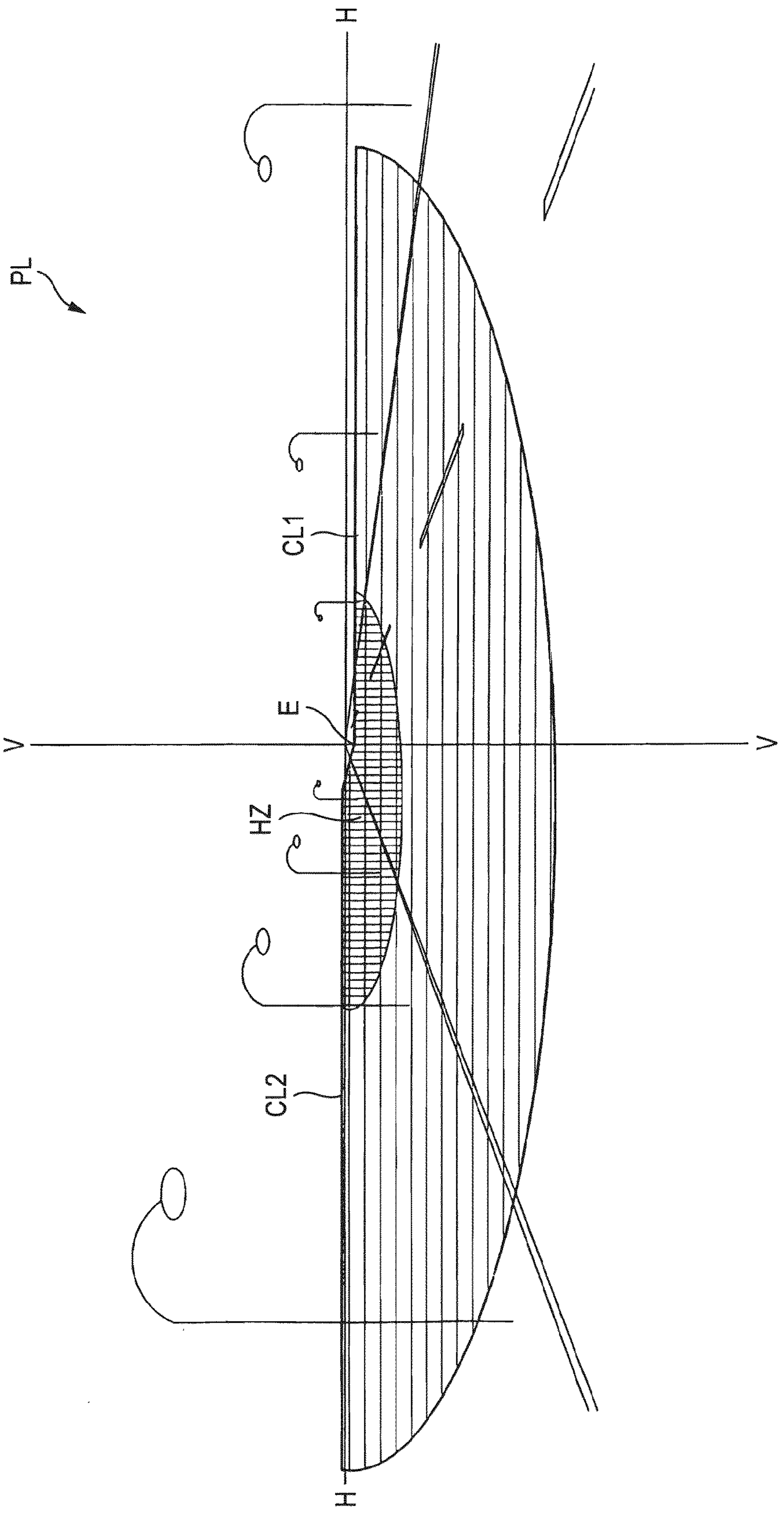
FIG. 4 is a view showing a low-beam light distribution pattern formed on a virtual vertical screen, which is positioned 25 meters ahead of a vehicle, by light that is emitted forward from the vehicular lamp.

FIG. 4 is a perspective view showing a low-beam light distribution pattern PL formed on a virtual vertical screen, which is positioned 25 meters ahead of a vehicle, by light that is emitted forward from the vehicular lamp 10.

As shown in FIG. 4, the low-beam light distribution pattern PL is a low-beam light distribution pattern for left light distribution. The low-beam light distribution pattern PL has cut-off lines CL1 and CL2, which are different from each other on the left and right sides, at the upper edge thereof.

The cut-off lines CL1 and CL2 extend in a horizontal direction so as to be different from each other on the left and right sides of a V-V line that is a vertical line passing through the point H-V, that is, a vanishing point in the forward direction of the lamp. The right portion of the low-beam light distribution pattern PL with respect to the V-V line is formed to extend in the horizontal direction as the cut-off line CL1 corresponding to the opposite lane, and the left portion of the low-beam light distribution pattern PL with respect to the V-V line is formed to extend in the horizontal direction as the cut-off line CL2 corresponding to the own lane. The cut-off line CL2 corresponding to the own lane is higher than the cut-off line CL1 corresponding to the opposite lane.

In the low-beam light distribution pattern PL, an elbow point E, which is an intersection between the low cut-off line CL1 and the V-V line, is positioned below the point H-V by an angle of about 0.5 to 0.6°. This is because the optical axis Ax of the lamp extends downward with respect to the longitudinal direction of a vehicle by about 0.5 to 0.6°. Furthermore, a hot zone HZ, which is an area having high luminosity, is formed near the left portion on the low-beam light distribution pattern PL so as to surround the elbow point E.

The low-beam light distribution pattern PL is formed by projecting the image of the light source 14*a* on the virtual vertical screen as a reverse projection image through the projection lens 12. The image of the light source 14*a* is formed on the rear focal plane of the projection lens 12 by the light that is emitted from the light source 14*a* and reflected from the reflector 16. The cut-off lines CL1 and CL2 are formed as the reverse projection images of the upper edge 18*a* of the shade 18.

In this case, the central axis Ax1 of the reflector 16 is inclined toward the own lane on the front side and intersects the optical axis Ax of the lamp in the vicinity of the projection lens 12. Accordingly, the central axis Ax1 of the reflector 16 intersects the rear focal plane of the projection lens 12 on the side that is closer to the opposite lane than the optical axis Ax of the lamp. Accordingly, a position where the light, which is emitted from the light source 14*a* and reflected from the reflector 16, passes through the rear focal plane of the projection lens 12 is displaced toward the opposite lane as a whole, as compared to when the central axis Ax1 of the reflector 16 corresponds to the optical axis Ax of the lamp.

Accordingly, the low-beam light distribution pattern PL, which is formed as the reverse image of the light source image formed on the rear focal plane of the projection lens 12, is displaced toward the own lane as a whole as compared to when the central axis Ax1 of the reflector 16 corresponds to the optical axis Ax of the lamp (the outline of the reflector 16 is shown by a two-dot chain line in FIG. 3A). Accordingly, the hot zone HZ of the low-beam light distribution pattern PL is also formed around a position that is closer to the own lane than the elbow point E.

Figure 5A:
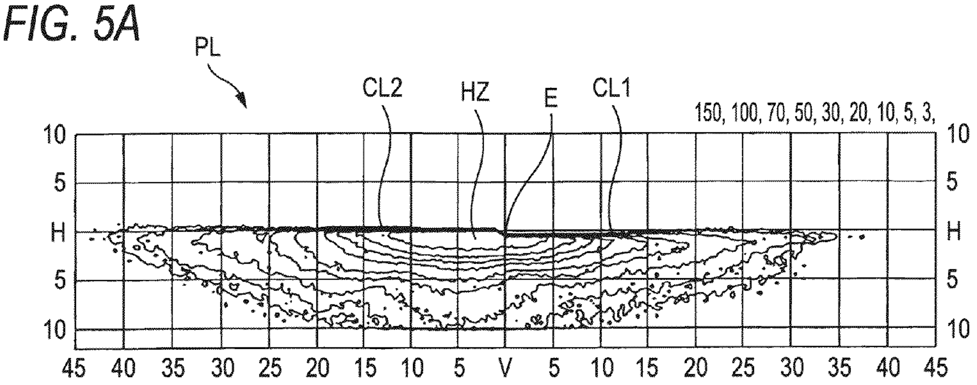
FIG. 5A is a view showing a simulation result of the low-beam light distribution pattern according to the exemplary embodiment of the invention.

FIG. 5A is a view showing a simulation result of the low-beam light distribution pattern PL according to the exemplary embodiment of the invention.

Figure 3B:
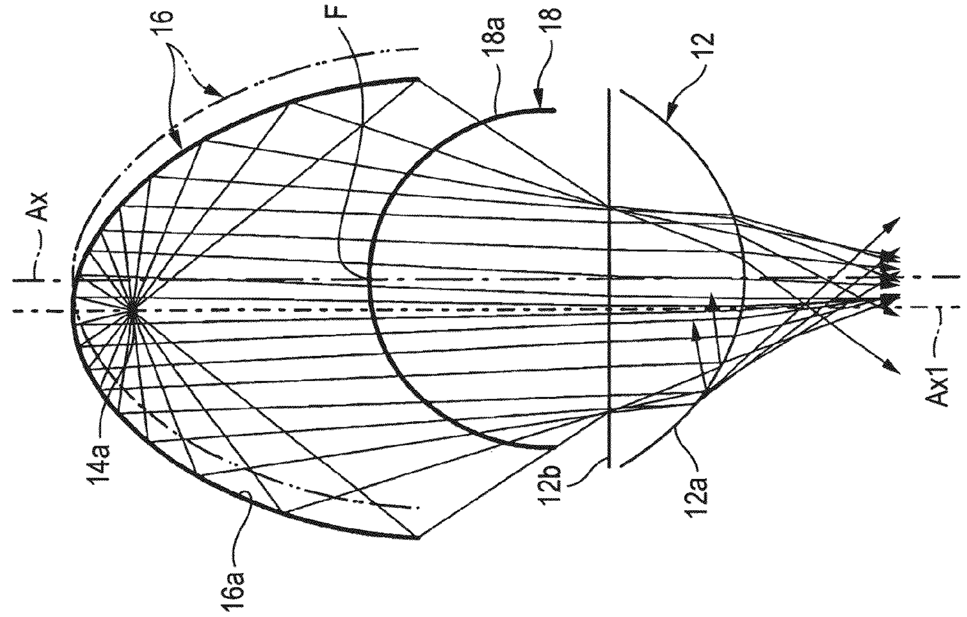
FIG. 3B is a cross-sectional view of a related art vehicular lamp.
Figure 3A:
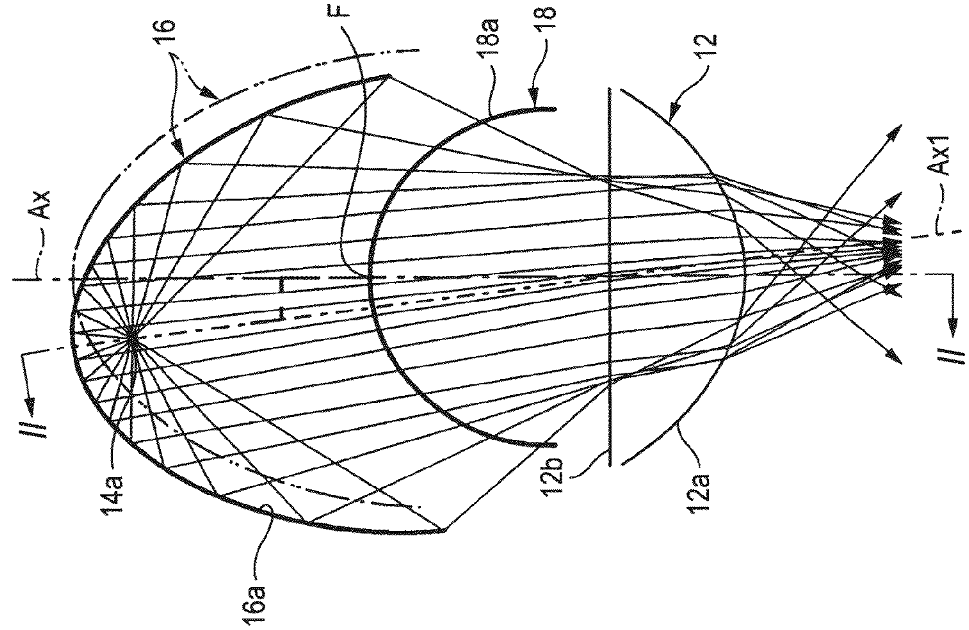
FIG. 3A is a cross-sectional view taken along a line III-III of FIG. 1.
Figure 5B:
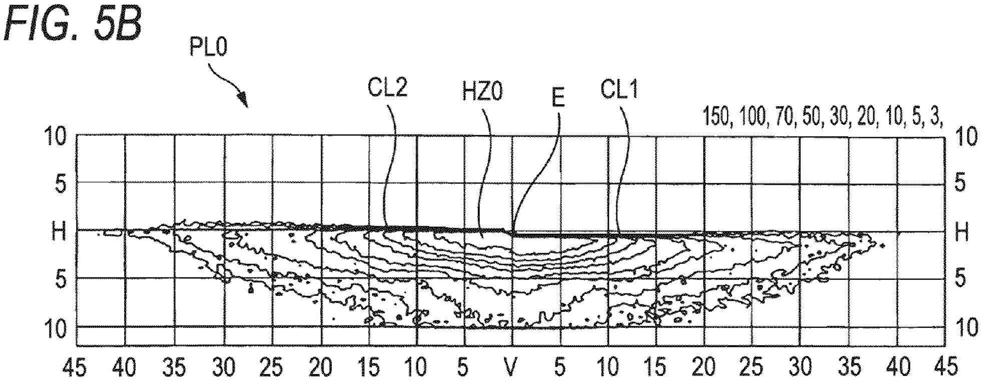
FIGS. 5B and 5C are views showing simulation results of a low-beam light distribution pattern according to the related art.

FIG. 5B is a view showing a simulation result of a low-beam light distribution pattern PL0, which is formed when the central axis Ax1 of the reflector 16 and the light source 14*a* correspond to the optical axis Ax of the lamp (that is, when the reflector 16 is positioned at a position shown by a two-dot chain line in FIG. 3B).

Figure 5C:
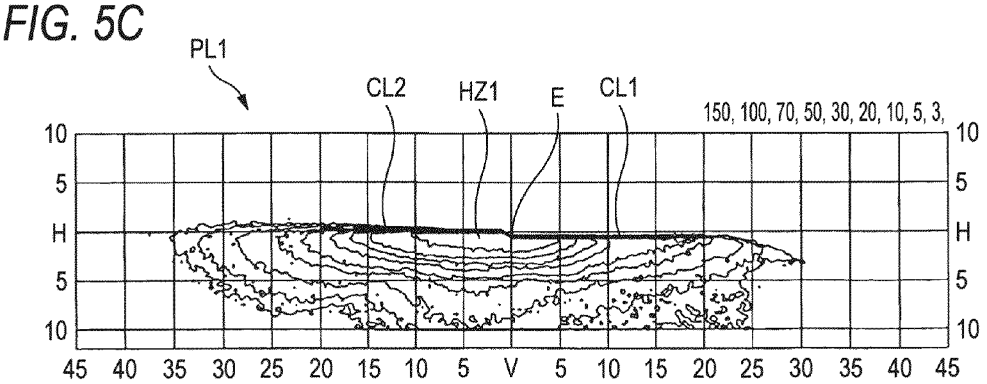

Further, FIG. 5C is a view showing a simulation result of a low-beam light distribution pattern PL1, which is formed when the central axis Ax1 of the reflector 16 and the light source 14*a* are moved parallel to the optical axis Ax of the lamp toward the opposite lane (that is, when the reflector 16 is positioned at a position shown by a solid line in FIG. 3B). In this case, the moving distance of the reflector 16, which is moved parallel to the optical axis of the lamp toward the opposite lane in FIG. 3B, is set to the same distance as the lateral displacement of the position, where the central axis Ax1 of the reflector 16 intersects the shade 18, from the optical axis Ax of the lamp in FIG. 3A.

When the central axis Ax1 of the reflector 16 corresponds to the optical axis Ax of the lamp, the low-beam light distribution pattern PL0 is substantially equally diffused toward both (left and right) sides of the V-V line as shown in FIG. 5B. The hot zone HZ0 of the low-beam light distribution pattern PL0 is formed substantially around the elbow point E.

In contrast, as shown in FIG. 5A, according to this exemplary embodiment, the low-beam light distribution pattern PL is a light distribution pattern that is formed by displacing the entire low-beam light distribution pattern PL0 toward the own lane. The hot zone HZ of the low-beam light distribution pattern PL is formed around a position that is closer to the own lane than the V-V line. In this case, since the position of the shade 18 is constant, the elbow point E is positioned on the V-V line.

On the other hand, when the central axis Ax1 of the reflector 16 is moved parallel to the optical axis Ax of the lamp toward the opposite lane, as shown in FIG. 5C, the low-beam light distribution pattern PL1 is a light distribution pattern that is displaced toward the own lane while the left and right diffusion angles of the low-beam light distribution pattern PL0 are decreased (that is, a light distribution pattern PL1 that is formed by decreasing the left and right diffusion angles of the low-beam light distribution pattern PL). The hot zone HZ1 of the low-beam light distribution pattern PL1 is also formed around a position that is closer to the own lane than the V-V line, and the elbow point E is positioned on the V-V line.

The reason why the diffusion angle of the low-beam light distribution pattern PL1 corresponding to the own lane is set to be smaller than the diffusion angle of the low-beam light distribution pattern PL corresponding to the own lane is as follows.

That is, as shown in FIG. 3B, the light, which is reflected from the end area of the reflecting surface 16*a* of the reflector 16 corresponding to the opposite lane and enters the projection lens 12, becomes the light that forms the diffusion area of the low-beam light distribution pattern PL1 corresponding to the own lane. However, since the incident angle of the light is significantly large when the light reaches the front surface 12*a* of the projection lens 12, the light is totally reflected from the front surface 12*a* and is not emitted forward. For this reason, the light, which forms the diffusion area of the low-beam light distribution pattern PL1 corresponding to the own lane, is not obtained, and the diffusion angle thereof corresponding to the own lane is small.

As described above, the vehicular lamp 10 according to this exemplary embodiment is a projector type lamp including the shade 18 and is configured to form the low-beam light distribution pattern PL. The light source 14*a* of the vehicular lamp 10 is disposed near the central axis Ax1 of the reflector 16 in plan view. However, the reflector 16 is disposed such that the central axis Ax1 of the reflector 16 intersects the optical axis Ax of the lamp in the vicinity of the projection lens 12 while being inclined toward the own lane on the front side.

According to this configuration, the central axis Ax1 of the reflector 16 is inclined toward the own lane on the front side and intersects the optical axis Ax of the lamp in the vicinity of the projection lens 12. Accordingly, the central axis Ax1 of the reflector 16 intersects the rear focal plane of the projection lens 12 on the side that is closer to the opposite lane than the optical axis Ax of the lamp. Accordingly, a position where the light, which is emitted from the light source 14*a* and reflected from the reflector 16, passes through the rear focal plane of the projection lens 12 is displaced toward the opposite lane as a whole as compared to when the central axis Ax1 of the reflector 16 corresponds to the optical axis Ax of the lamp. Accordingly, the low-beam light distribution pattern PL, which is formed as the reverse image of the light source image formed on the rear focal plane of the projection lens 12, is displaced toward the own lane as a whole as compared to when the central axis Ax1 of the reflector 16 corresponds to the optical axis Ax of the lamp. Accordingly, the hot zone HZ of the low-beam light distribution pattern PL is formed around a position that is closer to the own lane in the forward direction of the lamp.

In this case, since the central axis Ax1 of the reflector 16 intersects the optical axis Ax of the lamp in the vicinity of the projection lens 12, a position where the light, which is reflected from the reflector 16 and enters the projection lens 12, reaches the front surface 12*a* is in the range that is relatively close to the optical axis Ax of the lamp. Thus, even when the light reflected from the reflector 16 enters the projection lens 12 as a convergent light flux, the incident angle of the light, which is reflected from the end area of the reflecting surface 16*a* of the reflector 16 corresponding to the opposite lane and enters the projection lens 12, may be suppressed on the front surface 12*a* of the projection lens 12 at a value smaller than that in the related art where the central axis Ax1 of the reflector 16 is moved parallel to the optical axis of the lamp toward the opposite lane. Accordingly, all or most of the light, which is reflected from the reflector 16 and enters the projection lens 12, may be emitted forward without being totally reflected from the front surface 12*a*.

Therefore, it may be possible to effectively use the luminous flux of a light source. Furthermore, the light, which is reflected from the end area of the reflecting surface 16*a* of the reflector 16 corresponding to the opposite lane, becomes the light that forms the diffusion area of the low-beam light distribution pattern PL corresponding to the own lane. However, since all or most of the light is emitted forward without being totally reflected from the front surface 12*a* of the projection lens 12, it may be possible to prevent a decrease in diffusion angle of the low-beam light distribution pattern PL, which corresponds to the own lane.

According to this exemplary embodiment, in the projector type vehicular lamp 10 that is configured to form the low-beam light distribution pattern PL, it is possible to effectively use the luminous flux of a light source and to form the hot zone HZ of the low-beam light distribution pattern at a position that is close to the own lane in the forward direction of the lamp, without the sacrifice of the diffusion angle of the low-beam light distribution pattern PL corresponding to the own lane.

In particular, in this exemplary embodiment, the light source 14*a* is formed of a light-emitting chip of the light-emitting diode 14 whose the luminous flux is significantly smaller than the luminous flux of a discharge light emitter of a discharge bulb, a filament of a halogen bulb, or the like. Accordingly, it is particularly advantageous to employ the structure of this exemplary embodiment.

In addition, in this exemplary embodiment, the upper edge 18*a* of the shade 18 is curved forwards from a position on the optical axis Ax of the lamp toward both (left and right) sides. Accordingly, the upper edge 18*a* is disposed to extend substantially along the rear focal plane of the projection lens 12. Therefore, it is possible to clearly form the cut-off lines CL1 and CL2 up to both (left and right) edges of the cut-off lines.

In this case, the reflector 16 of the vehicular lamp 10 according to this exemplary embodiment is formed such that both (left and right) edges of the reflecting surface 16*a* of the reflector extend up to a position ahead of the rear focal point F of the projection lens 12. Accordingly, more light, which is reflected from the reflector 16, passes through the vicinity of the upper edge 18*a* of the shade 18, and enters the projection lens 12, may be secured at positions that are distant from the optical axis Ax of the lamp toward both (left and right) sides. Therefore, it is possible to make the portions of the left and right diffusion areas of the low-beam light distribution pattern PL, which are positioned below the cut-off lines CL1 and CL2, be brighter.

Furthermore, in this exemplary embodiment, the specific intersection between the central axis Ax1 of the reflector 16 and the optical axis Ax of the lamp is set in the vicinity of the rear surface 12*b* of the projection lens 12. Accordingly, a position where the light, which is reflected from the reflector 16 and enters the projection lens 12, reaches the front surface 12*a* is in the range that is closer to the optical axis Ax of the lamp. As a result, it is possible to more reliably emit the light, which reaches the front surface 12*a* of the projection lens 12, forward without totally reflecting the light.

In addition, in this exemplary embodiment, the inclination angle of the central axis Ax1 of the reflector 16 toward the own lane is set to about 7°. Accordingly, it is possible to form the hot zone HZ of the low-beam light distribution pattern PL at a position that is close to the own lane in the forward direction of the lamp, that is, at a position where distant visibility is preferably secured.

In the above-mentioned exemplary embodiment, the inclination angle of the central axis Ax1 of the reflector 16 toward the own lane has been set to about 7°. However, if the inclination angle is set in the range of about 5° to about 15°, it is possible to obtain substantially the same advantages as this exemplary embodiment.

Furthermore, in the above-mentioned exemplary embodiment, the light source 14*a* has been described as a light-emitting chip of the white light-emitting diode 14, and has been disposed such that the light-emitting surface of the light source 14*a* faces vertically upwards. However, even if the light source is disposed in a different direction, it is possible to obtain substantially the same advantages as this exemplary embodiment.

It is noted that the specific structure of the shade is not particularly limited as long as the "shade" is disposed so that the upper edge of the shade passes through the vicinity of the rear focal point of the projection lens and is adopted to block a part of the light reflected from the reflector.

The type of the "light source" is not particularly limited. For example, a discharge light emitter of a discharge bulb, a filament of a halogen bulb, and a light-emitting chip of a light-emitting diode may be employed as the light source. Furthermore, as long as the "light source" is disposed near the central axis of the reflector in plan view, the light source does not necessarily need to be disposed near the central axis of the reflector in side view.

Moreover, the specific value of the inclination angle of the central axis of the reflector toward the own lane, a specific intersection of the optical axis of the lamp, and the like are not particularly limited, as long as the "reflector" is disposed so that the central axis of the reflector intersects the optical axis of the lamp in the vicinity of the projection lens while being inclined toward the own lane on the front side. In this case, as long as the "central axis" intersects the optical axis of the lamp in plan view, the central axis does not necessarily need to intersect the optical axis of the lamp in side view.

As described above, the vehicular lamp according to exemplary embodiments of the invention is a projector type lamp including a shade, and can form a low-beam light distribution pattern. The light source of the vehicular lamp is disposed near the central axis of the reflector in plan view. However, since the reflector is disposed so that the central axis of the reflector intersects the optical axis of the lamp in the vicinity of the projection lens while being inclined toward the own lane on the front side, it may be possible to obtain the following advantages.

That is, the central axis of the reflector is inclined toward the own lane on the front side and intersects the optical axis of the lamp in the vicinity of the projection lens. Accordingly, the central axis of the reflector intersects the rear focal plane of the projection lens on the side that is closer to the opposite lane than the optical axis of the lamp. Thus, a position where the light, which is emitted from the light source and reflected from the reflector, passes through the rear focal plane of the projection lens is displaced toward the opposite lane as a whole as compared to when the central axis of the reflector corresponds to the optical axis of the lamp. Accordingly, the low-beam light distribution pattern, which is formed as the reverse image of the light source image formed on the rear focal plane of the projection lens, is displaced toward the own lane as a whole as compared to when the central axis of the reflector corresponds to the optical axis of the lamp. Accordingly, the hot zone of the low-beam light distribution pattern is formed around a position that is closer to the own lane in the forward direction of the lamp.

In this case, since the central axis of the reflector intersects the optical axis of the lamp in the vicinity of the projection lens, a position where the light, which is reflected from the reflector and enters the projection lens, reaches the front surface is in the range that is relatively close to the optical axis of the lamp. Thus, even when the light reflected from the reflector enters the projection lens as convergent light flux, the incident angle of the light when the light, which is reflected from the end area of the reflecting surface of the reflector corresponding to the opposite lane and enters the projection lens, reaches the front surface of the projection lens may be suppressed at a value smaller than that when the central axis of the reflector is moved parallel to the optical axis of the lamp toward the opposite lane like in the related art. Accordingly, all or most of the light, which is reflected from the reflector and enters the projection lens, may be emitted forward without being totally reflected from the front surface.

Accordingly, it is possible to effectively use the luminous flux of a light source. Furthermore, the light, which is reflected from the end area of the reflecting surface of the reflector corresponding to the opposite lane, becomes the light that forms the diffusion area of the low-beam light distribution pattern corresponding to the own lane. However, since all or most of the light is emitted forward without being totally reflected from the front surface of the projection lens, it is possible to prevent the diffusion angle of the low-beam light distribution pattern, which corresponds to the own lane, from being decreased.

According to exemplary embodiments of the invention, in the projector type vehicular lamp that is adapted to form the low-beam light distribution pattern, it is possible to effectively use the luminous flux of a light source and to form the hot zone of the low-beam light distribution pattern at a position that is close to the own lane in the forward direction of the lamp, without the sacrifice of the diffusion angle of the low-beam light distribution pattern corresponding to the own lane.

In the above-mentioned structure, if the upper edge of the shade is formed to be curved forwards from a position on the optical axis of the lamp toward both (left and right) sides, the upper edge of the shade extends substantially along the rear focal plane of the projection lens. Accordingly, it is possible to clearly form the cut-off lines up to the both (left and right) edges of the cut-off lines.

In this case, if both (left and right) edges of the reflecting surface of the reflector are formed to extend up to a position positioned ahead of the rear focal point of the projection lens, it is possible to secure more light, which is reflected from the reflector, passes through the vicinity of the upper edge of the shade, and enters the projection lens, at positions that are distant from the optical axis of the lamp toward both (left and right) sides. Therefore, it is possible to make the portions of the left and right diffusion areas of the low-beam light distribution pattern, which are positioned near the lower portion of the cut-off lines, be brighter.

In the above-mentioned structure, the specific intersection between the central axis of the reflector and the optical axis of the lamp is not particularly limited as described above. However, if the intersection is set in the vicinity of the rear surface of the projection lens, a position where the light, which is reflected from the reflector and enters the projection lens, reaches the front surface is in a range that is closer to the optical axis of the lamp. As a result, it is possible to more reliably emit the light, which reaches the front surface of the projection lens, forward without totally reflecting the light.

In the above-mentioned structure, the inclination angle of the central axis of the reflector toward the own lane is not particularly limited as described above. However, if the inclination angle is set to a value in the range of about 5 to 15°, it is possible to form the hot zone of the low-beam light distribution pattern at a position that is close to the own lane in the forward direction of the lamp, that is, at a position where distant visibility is preferably secured.

In the above-mentioned structure, if the light source is a light-emitting chip of a light-emitting diode, the luminous flux of the light source is significantly smaller than the luminous flux of a discharge light emitter of a discharge bulb, a filament of a halogen bulb, or the like. Accordingly, it is particularly effective to employ the structure according to exemplary embodiments of the invention.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. A vehicular lamp comprising:

a projection lens that is disposed on an optical axis of the lamp extending in a longitudinal direction of a vehicle;

a light source that is disposed on a rear side of a rear focal point of the projection lens;

a reflector that reflects light emitted from the light source so as to concentrate the light on the projection lens; and a shade that is disposed such that an upper edge of the shade extends through the vicinity of the rear focal point so as to block a part of the light reflected from the reflector, wherein, in plan view, the light source is disposed near the central axis of the reflector, and wherein, in plan view, the reflector is disposed such that the central axis of the reflector intersects the optical axis of the lamp at the rear surface of the projection lens while being inclined toward the own lane of the vehicle on the front side;

wherein the upper edge of the shade is curved forwards from a position on the optical axis of the lamp toward left and right sides of the lamp, and left and right edges of a reflecting surface of the reflector extend to a position ahead of the rear focal point.

2. The vehicular lamp according to claim 1, wherein an inclination angle of the central axis of the reflector toward the own lane is set in a range of about 5° to about 15°.

3. The vehicular lamp according to claim 1, wherein the light source comprises a light-emitting chip of a light-emitting diode.

* * * * *